United States Patent
Kalemba et al.

(10) Patent No.: US 7,402,272 B2
(45) Date of Patent: Jul. 22, 2008

(54) MOLD-SPRAYING APPARATUS OF MOLDING SYSTEM

(75) Inventors: Jacek Kalemba, Oakville (CA); Josef Graetz, Erin (CA)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 0 days.

(21) Appl. No.: 11/968,513

(22) Filed: Jan. 2, 2008

(65) Prior Publication Data
US 2008/0102221 A1 May 1, 2008

Related U.S. Application Data

(63) Continuation of application No. 11/690,161, filed on Mar. 23, 2007, now Pat. No. 7,364,419, which is a continuation of application No. 11/494,313, filed on Jul. 27, 2006, now abandoned.

(51) Int. Cl.
*B29C 45/24* (2006.01)

(52) U.S. Cl. .............. 264/309; 264/299; 264/DIG. 72; 427/427.3; 427/421.1; 425/90; 425/225; 425/542; 425/103

(58) Field of Classification Search .............. 425/103, 425/90, 225, 542; 118/72, 73; 264/13, 129, 264/299, 309, DIG. 72; 427/421.1, 424, 427/427.3
See application file for complete search history.

(56) References Cited

U.S. PATENT DOCUMENTS

| | | | |
|---|---|---|---|
| 3,857,363 | A | 12/1974 | Ferlito |
| 4,605,170 | A | 8/1986 | Thurner |
| 4,759,703 | A | 7/1988 | Krebser et al. |
| 4,976,603 | A | 12/1990 | Disimone |
| 6,192,968 | B1 | 2/2001 | Renkl et al. |
| 6,857,463 | B1 | 2/2005 | Jordan et al. |
| 6,938,669 | B2 | 9/2005 | Suzuki et al. |

*Primary Examiner*—Philip C Tucker
*Assistant Examiner*—Dimple N Bodawala

(57) ABSTRACT

Disclosed is a method of a mold-spraying apparatus for use with a molding apparatus. The mold-spraying apparatus has: (i) a spray nozzle, (ii) a rotatable shaft being supportive of the spray nozzle, and (ii) a camming surface. The method includes: (a) engaging the rotatable shaft with the camming surface, and (b) moving the camming surface so that the rotatable shaft may rotate.

12 Claims, 8 Drawing Sheets

MOLD-SPRAYING APPARATUS OF MOLDING SYSTEM

CROSS-REFERENCE TO RELATED APPLICATIONS

This patent application is a continuation patent application of a prior U.S. patent application Ser. No. 11/494,313, filed Jul. 27, 2006. This patent application is a continuation of 11/690,161, filed Mar. 23, 2007 now U.S. Pat. No. 7,364,419 which is a continuation of parent application No. 11/494,313 filed Jul. 27, 2006 now abandoned.

TECHNICAL FIELD

The present invention relates, generally, to molding systems, and more particularly, but not exclusively, the present invention relates to: (i) a mold-spraying apparatus of a molding system and/or (ii) a molding system having a mold-spraying apparatus, and/or (iii) a method of a mold spraying apparatus of a molding system, and/or (vi) a method of a molding system having a mold-spraying apparatus, amongst other things.

BACKGROUND

U.S. Pat. No. 4,976,603 (Inventor: Disimone; Published: 1990-12-11) discloses a device for removal of moldings from injection-molding machines. The device utilizes a suction cup rotating about a vertical shaft to hold and remove the molding.

U.S. Pat. No. 6,192,968 (Inventor: Renkl et al; Published: 2001-02-27) discloses preparing mold walls ready for the next molding cycle after removal of molded part.

U.S. Pat. No. 6,857,463 (Inventor: Jordan et al; Published: 2005-02-22) discloses a spraying system for applying one or more materials to an open mold within a molding machine. The spraying system has a spray head, a manipulator, a supply of materials, a conduit, a pressure-boosting device, and a control device.

U.S. Pat. No. 6,938,669 (Inventor: Suzuki et al; Published: 2005-09-06) discloses injection molding of metal products that involves heating a tip of hot runner, spraying a lubricant onto a molding surface and metering material, simultaneously between mold clamping and pressurizing processes.

SUMMARY

According to a first aspect of the present invention, there is provided a method of a mold-spraying apparatus for use with a molding apparatus, the mold-spraying apparatus having: (i) a spray nozzle, (ii) a rotatable shaft being supportive of the spray nozzle, and (ii) a camming surface, the method including: (a) engaging the rotatable shaft with the camming surface, and (b) moving the camming surface so that the rotatable shaft may rotate.

According to a second aspect of the present invention, there is provided a method of a mold-spraying apparatus of a molding apparatus, the molding apparatus having: (a) a fixed platen, (b) a movable platen, (c) a platen-moving mechanism being configured to move the movable platen relative to the fixed platen, and (d) a mold having molding surfaces being supported by the fixed platen and the movable platen, and the mold defining a mold envelope, the mold-spraying apparatus having: (i) a spray nozzle, (ii) a rotatable shaft being rotatably mounted to the fixed platen, the rotatable shaft being attached to the spray nozzle, (iii) a camming surface being movable with the movable platen, (iv) a cam follower being attached to the rotatable shaft, and the cam follower being engageable with the camming surface, the method including: (a) actuating the platen-moving mechanism so that the movable platen may be moved; and (b) engaging the cam follower with the camming surface so that the rotatable shaft and of the spray nozzle may be rotated, and the spray nozzle becomes: (I) rotated proximate of the molding surfaces to spray the molding surfaces when a movable portion of the mold being attached with the movable platen becomes separated from a fixed portion of the mold being attached with the fixed platen, and (II) rotated to a position outside the mold envelope before the movable portion of the mold makes contacts the fixed portion of the mold.

A technical effect, amongst other technical effects, of the aspects of the present invention is an improved mold-spraying apparatus. Preferable embodiments of the present invention are subject of dependent claims.

BRIEF DESCRIPTION OF THE DRAWINGS

A better understanding of the exemplary embodiments of the present invention (including alternatives and/or variations thereof) may be obtained with reference to the detailed description of the exemplary embodiments of the present invention along with the following drawings, in which.

The drawings are not necessarily to scale and are sometimes illustrated by phantom lines, diagrammatic representations and fragmentary views. In certain instances, details that are not necessary for an understanding of the embodiments or that render other details difficult to perceive may have been omitted.

DETAILED DESCRIPTION OF THE EXEMPLARY EMBODIMENTS

Figure 1:
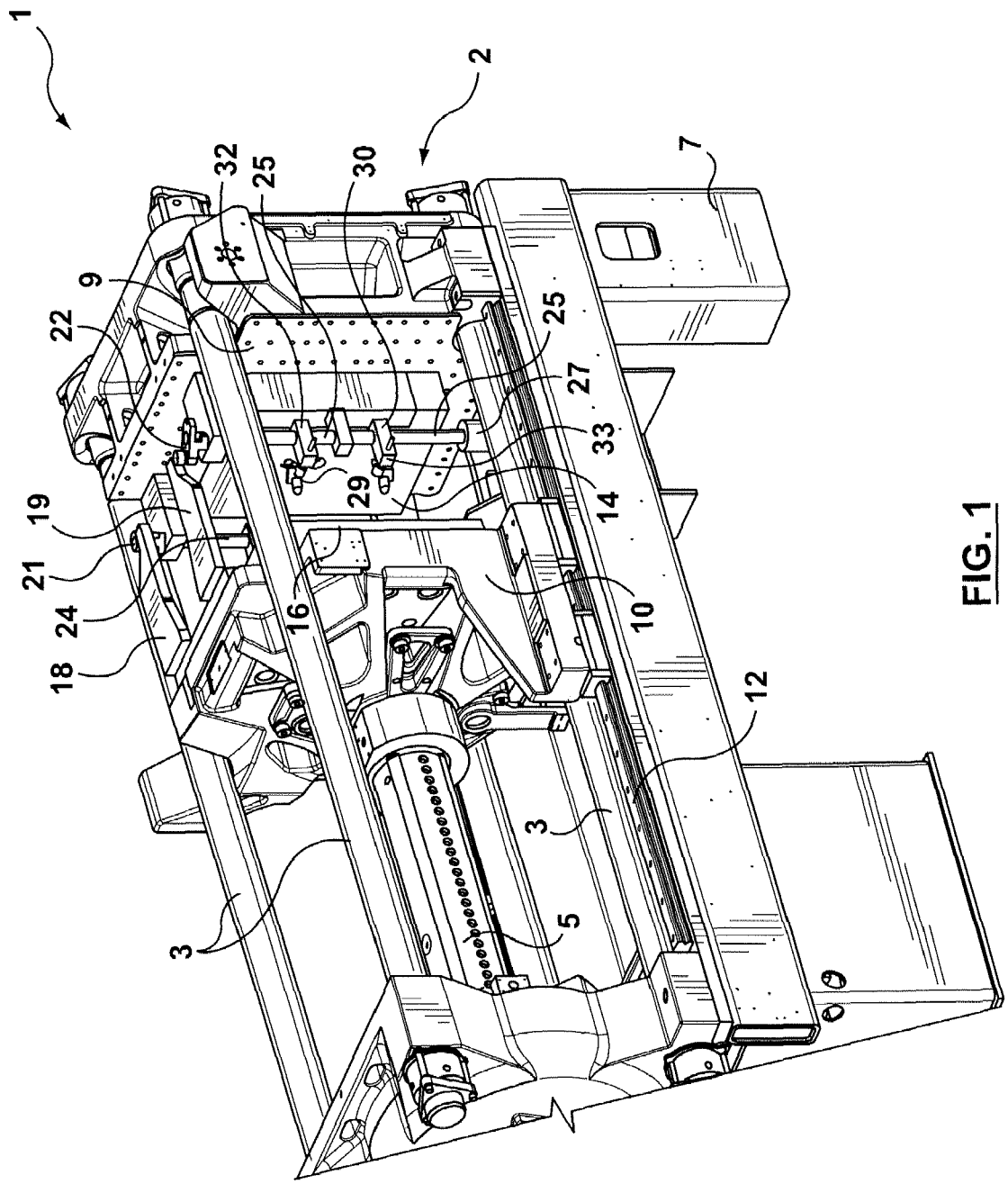
FIG. 1 is a perspective view of an injection molding machine having a mold-spray apparatus in accordance with a first exemplary embodiment.

FIG. 1 is a perspective view of an injection molding machine 1 (which is an example of a molding system for a molding machine), the injection molding machine 1 has a mold-spray apparatus 2 in accordance with the first exemplary embodiment. The molding machine 1 and the mold-spraying apparatus 2 may be sold separately or may be sold in combination. The mold-spraying apparatus 2 includes a rotatable shaft supportive of a spray nozzle.

Preferably, upon rotation of the rotatable shaft, the spray nozzle becomes positionable proximate of a mold of the molding system sufficiently enough so that the mold becomes sprayable by the spray nozzle. The injection molding machine 1 includes tie bars 3, a clamp column 5 on a machine frame 7. A fixed platen 9 and movable platen 10 are situated on the machine frame 7 in a manner well understood in the art. The movable platen 10 is guided along rails 12 between mold open and closed positions. A stationary mold half 14 is bolted or otherwise mounted on fixed platen 9. A movable mold half 16 is similarly mounted on movable platen 10. When the mold is closed the two mold halves 14 and 16 create the necessary molding space in a manner well understood in the art.

When molding it is often necessary to treat the mold before performing a molding operation. Depending on the materials being used in the molding operation, it is sometimes necessary to clean the mold after each molding operation by washing the mold with water or air or some other cleaning solution. In other instances, it may be necessary to treat the mold with a non-welding or release agent to ensure that the molded part does not weld or stick to the mold. In the past, these pretreatment procedures have required elaborate and complex devices to ensure that the molding surfaces are uniformly and consistently treated. The exemplary embodiment provides a simple, but reliable, apparatus and process for delivering the required material to the mold surfaces reliably.

As shown in FIG. 1, this apparatus includes a pair of cams 18 and 19 and cam followers 21 and 22. The cam followers 21 and 22 are attached to rotatable shafts 24 and 25, respectively. The shafts 24 and 25 may be mounted on the mold, platen or machine in a position to be rotated by the movement of the cams 18 and 19 on the movable platen 10. The determination as to where to mount the shafts 24 and 25 may be determined by the type of mold that is being used. For example, if a particular mold is one of a number of very similar molds where the cavities are the same in number and in substantially the same position within the mold, it may be acceptable to locate the shafts 24 and 25 on the fixed platen 9 or on the movable platen 10. If the particular mold is unique in that it may have more cavities or cavities that are substantially different from any other mold then it may be appropriate to mount the shafts 24 and 25 on one mold half. In the embodiment shown in FIG. 1, the shafts 24 and 25 are mounted on the stationary mold half 14 since the mold shown is a four cavity mold that is one of many similar molds.

The shafts 24 and 25 extend from rotary manifolds. Only rotary manifold 27 can be seen in FIG. 1. The rotary manifolds provide air or lubricant or other desired fluids to tubes within the shafts 24 and 25 to deliver the fluids to nozzles connected to the shafts 24 and 25 located at pre-selected positions along the shafts 24 and 25. The pre-selected positions are determined by the cavity placement within the mold. The rotary manifolds also include lubricating bearings in order to allow ease of rotation for the shafts 24 and 25.

As shown in FIG. 1, nozzles 29 and 30 are mounted on mounting blocks 32 and 33, respectively. The nozzle mounting blocks 32 and 33 are mounted on shaft 25 and provide support for nozzles 29 and 30 and fluid communication between the shaft 25 and the nozzles 29 and 30. A similar arrangement of nozzles and mounting blocks is situated on the shaft 24 but is not visible in FIG. 1.

The nozzles 29 and 30 on the shafts 24 and 25 are moved into and out of the mold as the shafts 24 and 25 rotate. As shown in FIG. 1, the mold is open with the nozzles located between the molding faces. In this position, each cam follower 21 and 22 is in its innermost position against the cam surface of the respective cam 18 or 19. When the movable platen 10 is in motion to close the mold the cam followers 21 and 22 travel along the cam surface of the respective cam 18 or 19. This motion of the cam followers 21 and 22 rotates the shafts 24 and 25. This action rotates the attached nozzles from a position between the mold faces to a position outside the mold when the mold is closed so that the nozzles do not interfere with the mold during a molding operation.

Figure 2:
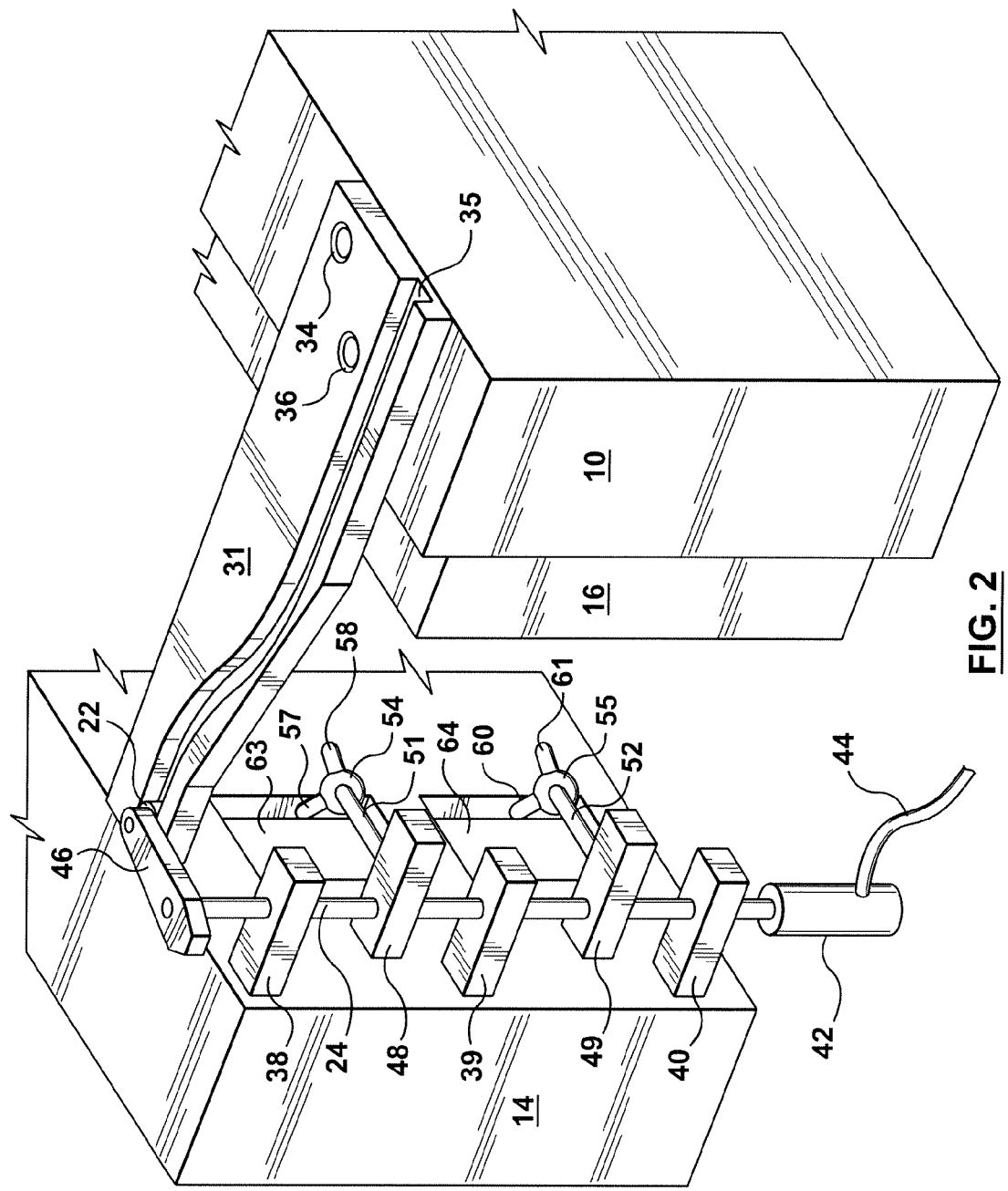
FIG. 2 is a schematic representation of the mold-spray apparatus of FIG. 1 shown in an open mold position.
Figure 3:
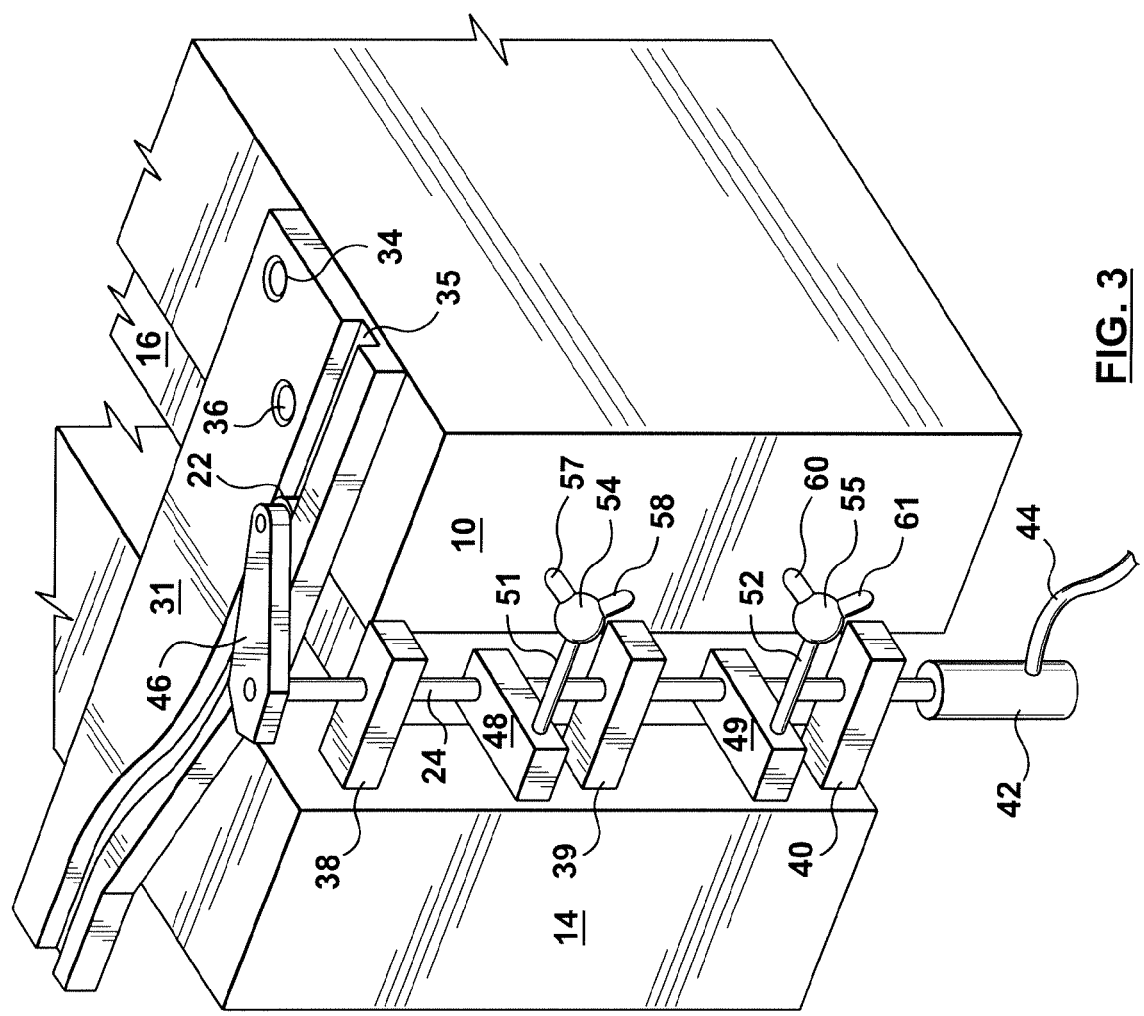
FIG. 3 is a schematic representation of the mold-spray apparatus of FIG. 1 shown in a closed mold position.

FIG. 2 is a schematic representation of the mold-spray apparatus 2 of FIG. 1 shown in an open mold position. FIG. 3 is a schematic representation of the mold-spray apparatus 2 of FIG. 1 shown in a closed mold position. In FIG. 2 the mold is in the open position with the nozzles positioned between the mold faces. In FIG. 3 the mold is closed and the nozzles are situated outside the mold. For ease of reference, similar elements in FIGS. 1, 2 and 3 will be referenced with the same reference number. FIGS. 2 and 3 illustrate, schematically, the operation of the nozzle positioning system located on the side of the mold obscured by the movable platen 10. As shown in FIG. 2, the mold formed by mold halves 14 and 16 is open with the movable platen 10 in the mold open position.

A cam plate 31 is attached to the movable platen 10 by bolts 34 and 36. A cam groove 35 is formed in the cam plate 31. In this illustration, the cam surface is provided by a groove to better retain the cam follower 22. As shown in FIG. 1, the cam surface is open. Each design has its advantages and disadvantages. With the open surface, it is relatively easy to retract the nozzles into a position where the nozzles may be serviced or replaced. The shaft can be rotated with relative ease by applying a torque on the shaft and rotating it in a position where it can be serviced. However, the open groove makes it somewhat more difficult to restrain the cam follower within the desired travel path since the cam follower may lose contact with the open surface, and furthermore, the cam follower and shaft will need some sort of biasing mechanism in order to actuate the rotation of the shafts 24 and 25 back to the starting position once the cams rotate them out of the mold. With the grooved cam surface the cam follower is readily retained within the desired travel path but servicing and replacement of the nozzles is slightly more complicated since the cams cannot simply be rotated outside of the assembly due to the grooves they lie in. In order to service, the cams can only be rotated by movement of the mold halves relative to each other, meaning more energy and power consumption during service periods or dismounting the cam plate from the platen.

Rotatable shaft 24 is positioned in relationship to mold half 14 by three mounting blocks 38, 39, and 40. Each mounting block 38, 39 and 40 includes a bearing surface to permit the shaft 24 to rotate within the mounting block. Of course, the number of mounting blocks can be varied to suit the circumstances. For a large complex mold more mounting blocks may be required whereas for a simple mold two may be sufficient.

The base of shaft 24 is connected to a rotary manifold 42 and provides support for the shaft 24 and a fluid connection to the shaft 24 from a fluid source connected to the hose 44. The shaft 24 has a supply channel configured to supply a spraying material to the spray nozzles 51, 58, 60, 61. The hose 44 preferably engages the manifold 42, the manifold preferably being mounted rigidly on the frame 7 of the molding system 1. The manifold 42 contains bearings in order to allow rotation of the shaft 24 without rotation of the manifold 42 relative to the moving and stationary platens. The hose 44 supplies fluid to the manifold 42 which then transfers the fluid to the supply channel of the rotating shaft 24.

The top end of shaft 24 is firmly attached to a cam follower arm 46. Cam follower arm 46 extends towards cam groove 35. Cam follower 22 is attached to one end of arm 46 and extends into groove 35 and is confined to movement within the groove 35.

As shown in FIG. 2, two nozzle mounting blocks 48 and 49 are firmly attached to rotatable shaft 24. Fluid channels (not shown) within each block 48 and 49 connect to fluid channels (not shown) within the shaft 24 and provide fluid connections to the support and supply rods 51 and 52. The rods 51 and 52 support nozzle connectors 54 and 55 and enable fluid connections through to connectors 54 and 55.

The nozzles 57 and 58 are attached to nozzle connector 54 and nozzles 60 and 61 are attached to nozzle connector 55. When the nozzles are in the operative position shown in FIG. 2, the nozzle 57 is in position to spray fluid onto the cavity 63 and nozzle 60 is in position to spray fluid onto the cavity 64 in the fixed mold half 14. Similarly, nozzles 58 and 61 are in position to spray liquid onto molding surfaces (not shown) on movable mold half 16.

The controls and actuation devices for operating the nozzles are well known to those versed in injection molding technology and are not described herein nor do they form a part of the exemplary embodiment. The exemplary embodiment is primarily concerned with providing an inexpensive and reliable system for positioning nozzles within an open mold and retracting the nozzles from within the mold before it is closed.

As will be apparent to those skilled in the art, the shape of the cam surface may be significantly different for different types of parts and different molding machines. The speed with which the arms must be withdrawn from within the mold is influenced, at least in part, by the injection cycle speed of the machine. The size or profile of the part influences, at least in part, the separation of the mold faces when the mold is open. This separation will influence the shape of the cam surface as it will put a limit on the space available to rotate the nozzles in and out of the mold. One parameter of the cam profile is the cam length. Depending on the mold stroke length, the cam length will control the speed at which the shaft 24 rotates. The second major parameter is the groove 35 profile. The groove 35 profile is instrumental in controlling the rate of rotation of the shaft. Depending on the profile, the shaft may rotate at a slow speed or at a high speed depending on the mold stroke length.

FIG. 3 illustrates, schematically, the nozzle positioning system with the mold closed. As shown, the mold faces on the fixed and movable molds 14 and 16 are in sealing engagement and the nozzles 57, 58, 60 and 61 are in a retracted position alongside the movable mold 10. The shaft 24 has rotated approximately ninety degrees by rotation of the arm 46. The cam follower 22 caused arm 46 to rotate as it followed the groove 35 as the movable platen 10 was moved towards the mold closed position.

Figure 4:
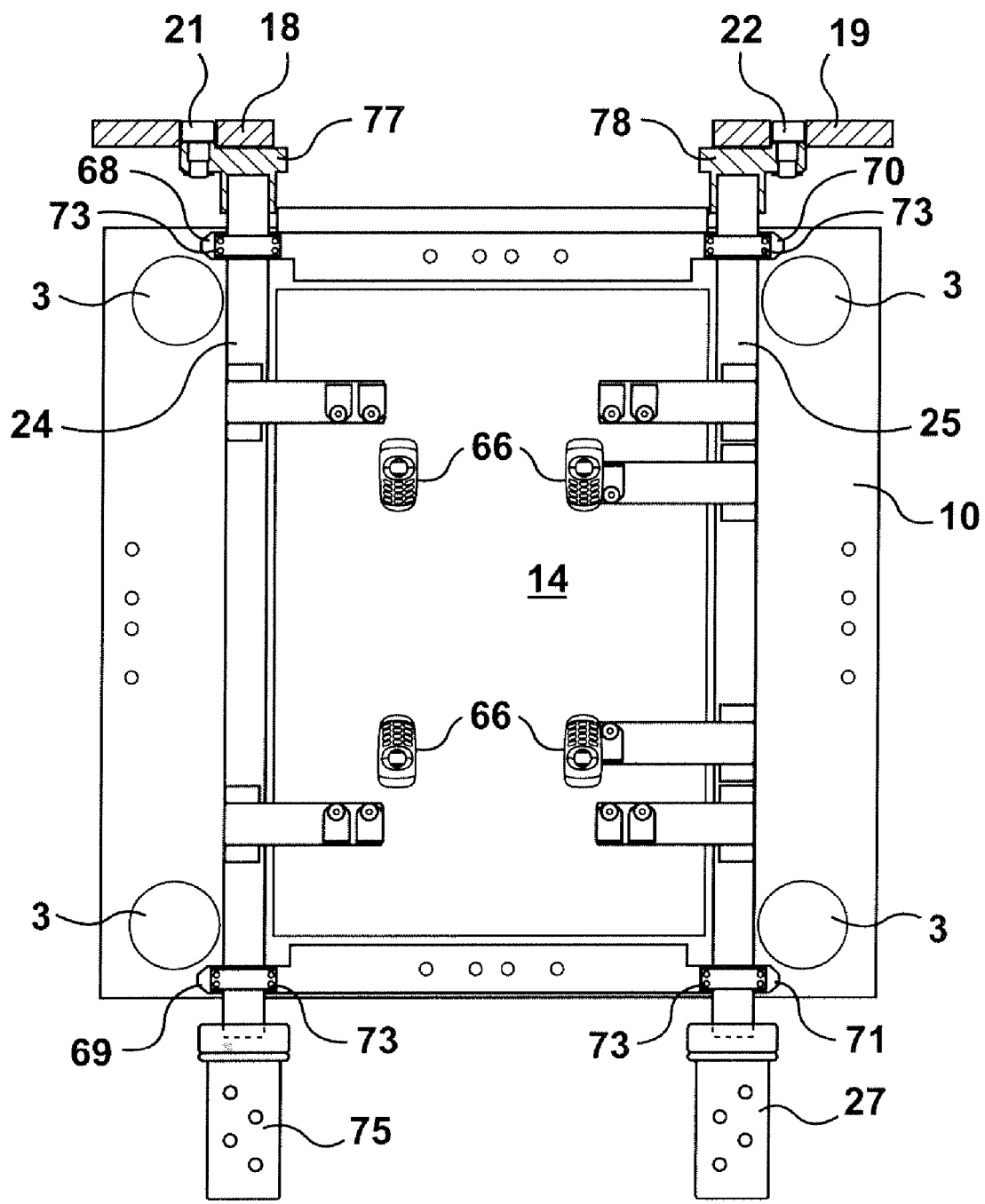
FIG. 4 is a plan view of a portion of a mold and the mold-spray apparatus of FIG. 1.

FIG. 4 is a plan view of a portion of a mold and the mold-spray apparatus 2 of FIG. 1. FIG. 4 is a plan view within the middle of the mold facing toward the movable mold half. Like parts on FIG. 4 are referenced with the same reference characters as are used on FIG. 1. The cavities 66 on the fixed mold half preferably form covers for mobile telephone sets when the mold is closed. Cams 18 and 19 are located above the platen 10 (not shown in FIG. 4). The shaft 24 extends through mounting blocks 68 and 69. Shaft 25 extends through mounting blocks 70 and 71. Each mounting block 68, 69, 70 and 71 includes bearings 73 to permit rotation of the shafts 24 and 25. Shafts 24 and 25 are supported in rotary manifolds 75 and 27. The fluid to be sprayed on the molds is transferred through the rotary manifolds 75 and 27 and to the hollow shafts 24 and 25 coupled to the manifolds by bearings 73. Once the fluid is in the shafts 24 and 25, the fluid travels upward towards the nozzle bodies and through each nozzle.

Cam followers 21 and 22 extend upwards from cam follower arms 77 and 78, respectively, and engage a cam surface on cams 18 and 19, respectively, as best shown in FIG. 1.

Figure 5:
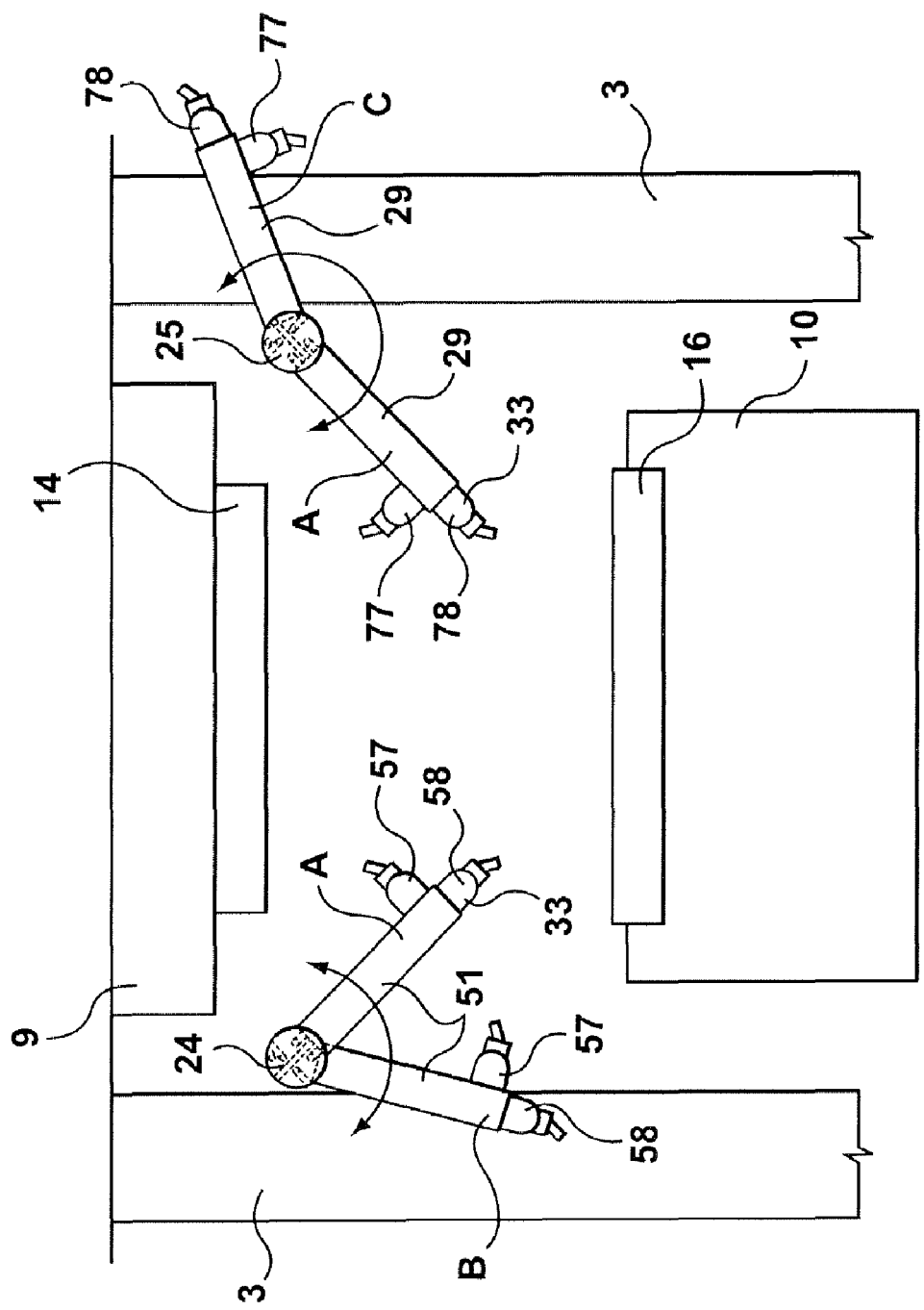
FIG. 5 is a schematic top view of the mold-spray apparatus of FIG. 1.

FIG. 5 is a schematic top view of the mold-spray apparatus 2 of FIG. 1. FIG. 5 is a top schematic view illustrating the positioning of the sprayer heads during mold spraying, mold closure and sprayer head replacement or repair. When the shafts 24 and 25 have rotated the sprayer arms 51 and 29 into position A the nozzles 57, 58, 77 and 78 are in position to spray the corse and/or the cavities in the mold. When the shafts 24 and 25 are rotated into position B (only shaft 24 shown in this position) the nozzles 57, 58, 77 and 78 are in a parked position along the outside of the movable platen 10. When the shafts 24 and 25 are rotated into position C (only shaft 25 shown in this position) the nozzles 57, 58, 77 and 78 are in a readily accessible position for servicing or replacement of the nozzles. The same positions A, B, and C are attainable with the grooved cam configuration of FIG. 2, only in order to attain position C, the cam follower 22 and cam 46 would need to be extracted out of the groove 35 and rotated into position C.

Figure 6:
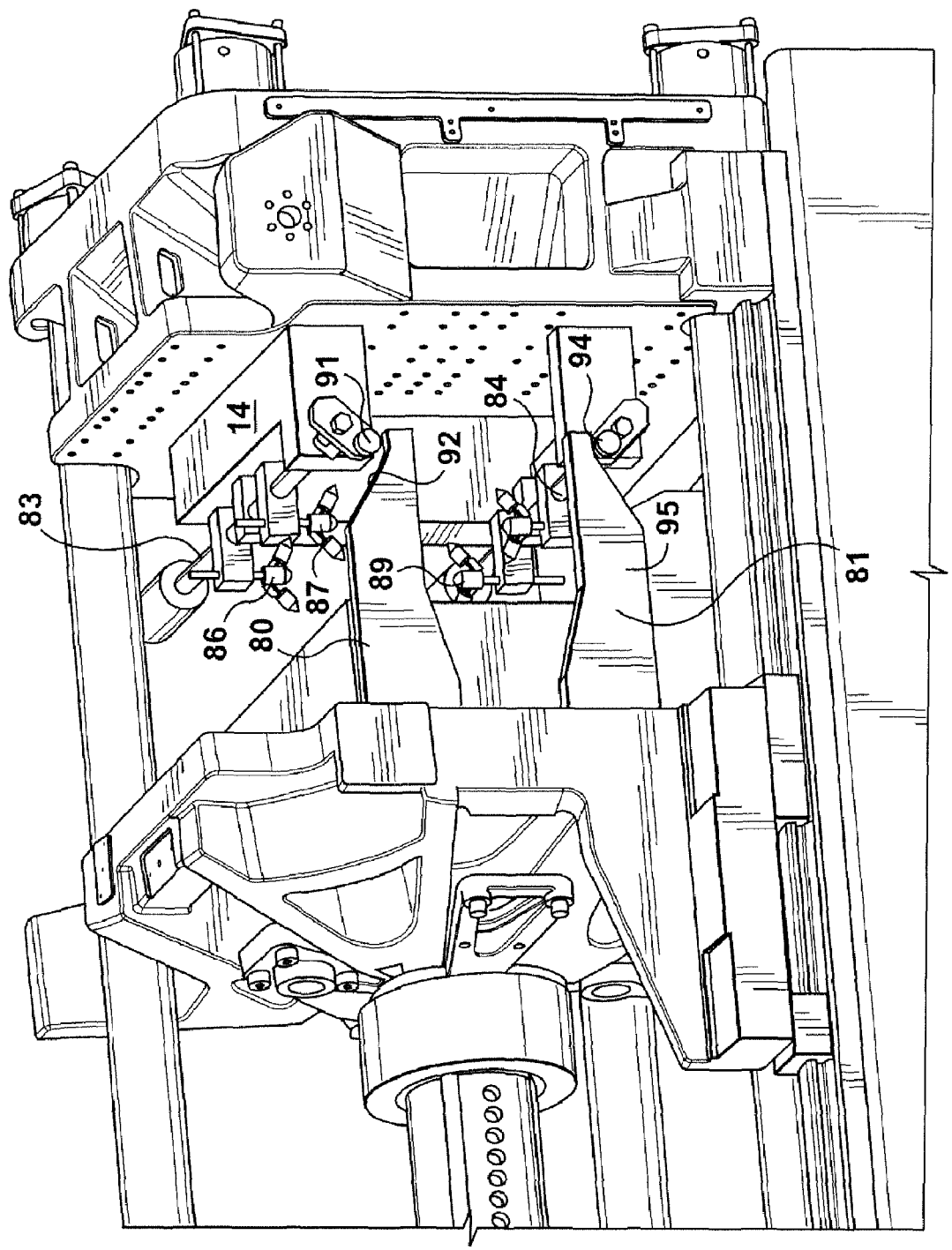
FIG. 6 is a perspective view of an injection molding machine having a mold-spraying apparatus according to a second exemplary embodiment.

FIG. 6 is a perspective view of an injection molding machine having a mold-spraying apparatus according to a second exemplary embodiment. The rotatable shafts for rotating the spray heads into and out of the mold are located in a horizontal plane rather that a vertical. The cams 80 and 81 are mounted on the side of the movable mold half 16 and the rotatable shafts 83 and 84 are mounted at the top and the bottom of the fixed mold half 14. In this embodiment the spray head assemblies 86 and 87 are rotated upwardly out of the mold when the mold closed by the action of cam follower 91 moving along cam surface 92. Likewise, spray head assemblies 89 and 90 are rotated downwards when the mold closes by the action of cam follower 94 moving along cam surface 95.

Figure 7:
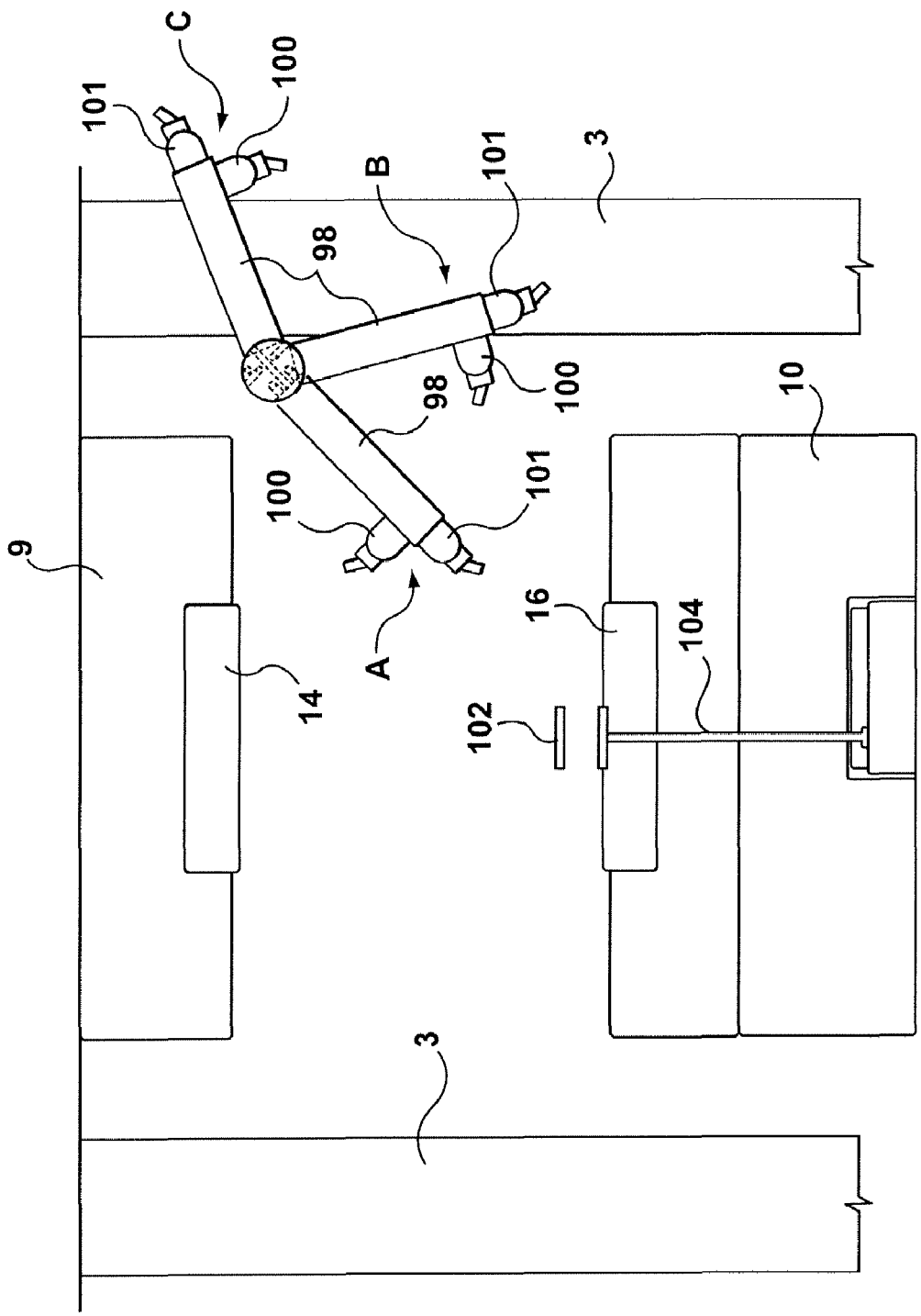
FIG. 7 is a side schematic view of mold-spray mechanism of FIG. 6.
Figure 8:
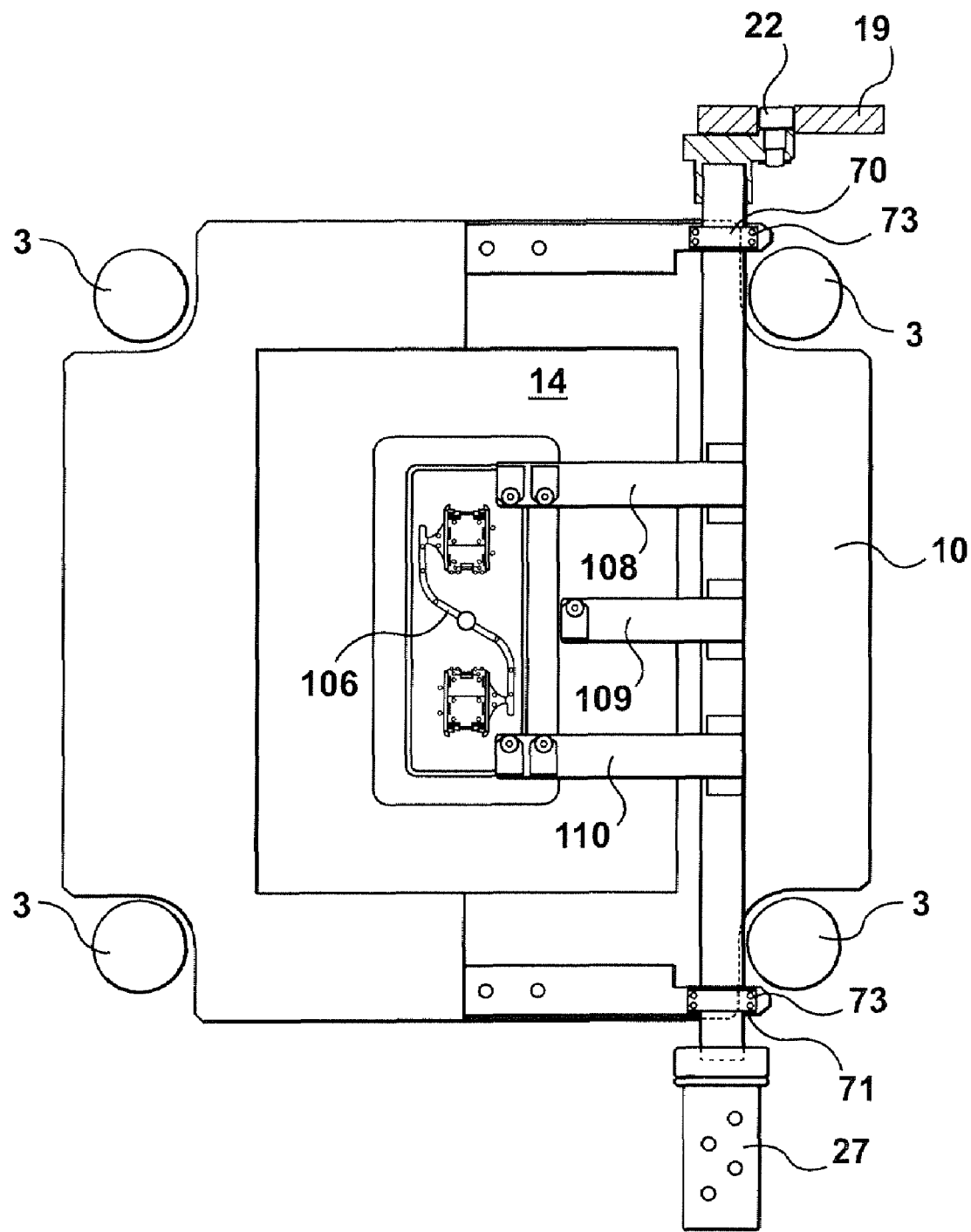
FIG. 8 is a plan schematic view of the mold-spraying mechanism of FIG. 6.

FIG. 7 is a side schematic view of mold-spray mechanism of FIG. 6; FIG. 8 is a plan schematic view of the mold-spraying mechanism of FIG. 6. A single shaft is used to rotate sprayer heads into and out of the mold. FIG. 7 is a side view of the apparatus and FIG. 8 is a plan view directed toward the fixed platen. FIG. 7 shows a single rotatable shaft 97 with a nozzle connector arm 98. The arm 98 is illustrated in the three positions A, B and C. In position A the spray nozzles 100 and 101 are in position to spray the cores and/or the cavities in the mold, in position B the nozzles 100 and 101 are in a parked position outside the mold and in position C the nozzles 100 and 101 are in a service position. This is similar to the positioning of nozzles illustrated in FIG. 5 and operates in the same manner as the operation described with reference to FIG. 5

Additionally FIG. 7 shows the release of a part 102 from movable mold half 16 by ejector mechanism 104 on movable platen 10, a fixed mold half 14 on fixed platen 10 and tie bars 3.

FIG. 8 is similar to FIG. 4 except that only a single rotatable shaft is required. Elements that correspond between the two figures have been identified by the same reference characters. The description given with reference to FIG. 4 adequately describes the structure and operation of these common components.

FIG. 8 additional shows a runner 106 and three sets of sprayer head assemblies 108, 109 and 110. The runner provides a path for the injection material as is well known in the industry. The three sets of sprayer heads are configured to spray fluid on three adjacent mold surfaces located on the movable platen and stationary platen. According to a variant, more than three or less than three sprayer heads are used depending on the number of cavities in the working mold.

The description of the exemplary embodiments provides examples of the present invention, and these examples do not limit the scope of the present invention. It is understood that the scope of the present invention is limited by the claims. The exemplary embodiments described above may be adapted for specific conditions and/or functions, and may be further extended to a variety of other applications that are within the scope of the present invention. Having thus described the exemplary embodiments, it will be apparent that modifications and enhancements are possible without departing from the concepts as described. It is to be understood that the exemplary embodiments illustrate the aspects of the invention. Reference herein to details of the illustrated embodiments is not intended to limit the scope of the claims. The claims themselves recite those features regarded as essential to the present invention. Therefore, what is to be protected by way of letters patent are limited only by the scope of the following claims:

What is claimed is:

1. A method of operating a mold-spraying apparatus for use with a molding apparatus, the mold-spraying apparatus having: (i) a spray nozzle, (ii) a rotatable shaft being supportive of the spray nozzle, and (ii) a camming surface, the method comprising:
    engaging the rotatable shaft with the camming surface; and
    moving the camming surface so that the rotatable shaft may rotate.

2. The method of claim 1, wherein:
    upon rotation of the rotatable shaft, the spray nozzle becomes positionable proximate of a mold of a molding system sufficiently enough so that the mold becomes sprayable by the spray nozzle.

3. The method of claim 1, further comprising:
    positioning the rotatable shaft relative to a mold.

4. The method of claim 1, further comprising:
    connecting the rotatable shaft with a mechanism being actuatable to rotate the rotatable shaft.

5. The method of claim 1, further comprising:
    connecting the rotatable shaft with a mechanism being actuatable to rotate the rotatable shaft during opening and closing of a mold.

6. The method of claim 1, further comprising:
    connecting the rotatable shaft with a mechanism being actuatable to rotate the rotatable shaft:
        (i) within a mold envelope of a mold after the mold is opened, and
        (ii) outside of the mold envelop of the mold before the mold is closed.

7. The method of claim 1, further comprising:
    supplying a spraying material to the spray nozzle.

8. The method of claim 1, further comprising:
    camming the rotatable shaft so that the rotatable shaft rotates.

9. The method of claim 1, further comprising:
    rotating the rotatable shaft so as to rotate the spray nozzle into a mold envelope of a mold after a movable-mold portion and a fixed-mold portion of the mold are separated from each other.

10. The method of claim 1, further comprising:
    rotating the rotatable shaft to rotate the spray nozzle into a mold envelop of a mold as a movable-mold portion and a fixed-mold portion of the mold are separating from each other.

11. The method of claim 1, further comprising:
    rotating the rotatable shaft to rotatably retract the spray nozzle from a mold envelop defined by a mold before a movable-mold portion and a fixed-mold portion of the mold are closed against each other.

12. A method of operating a mold-spraying apparatus of a molding apparatus, the molding apparatus having: (a) a fixed platen, (b) a movable platen, (c) a platen-moving mechanism being configured to move the movable platen relative to the fixed platen, and (d) a mold having molding surfaces being supported by the fixed platen and the movable platen, and the mold defining a mold envelope, the mold-spraying apparatus having: (i) a spray nozzle, (ii) a rotatable shaft being rotatably mounted to the fixed platen, the rotatable shaft being attached to the spray nozzle, (iii) a camming surface being movable with the movable platen, (iv) a cam follower being attached to the rotatable shaft, and the cam follower being engageable with the camming surface, the method comprising:
    actuating the platen-moving mechanism so that the movable platen may be moved; and
    engaging the cam follower with the camming surface so that the rotatable shaft and of the spray nozzle may be rotated, and the spray nozzle becomes:
        (i) rotated proximate of the molding surfaces to spray the molding surfaces when a movable portion of the mold being attached with the movable platen becomes separated from a fixed portion of the mold being attached with the fixed platen, and
        (ii) rotated to a position outside the mold envelope before the movable portion of the mold makes contacts the fixed portion of the mold.

* * * * *